Aug. 10, 1943.         C. B. NELSON         2,326,485
SEA FOOD WASHING MACHINE
Filed April 14, 1942         3 Sheets-Sheet 1
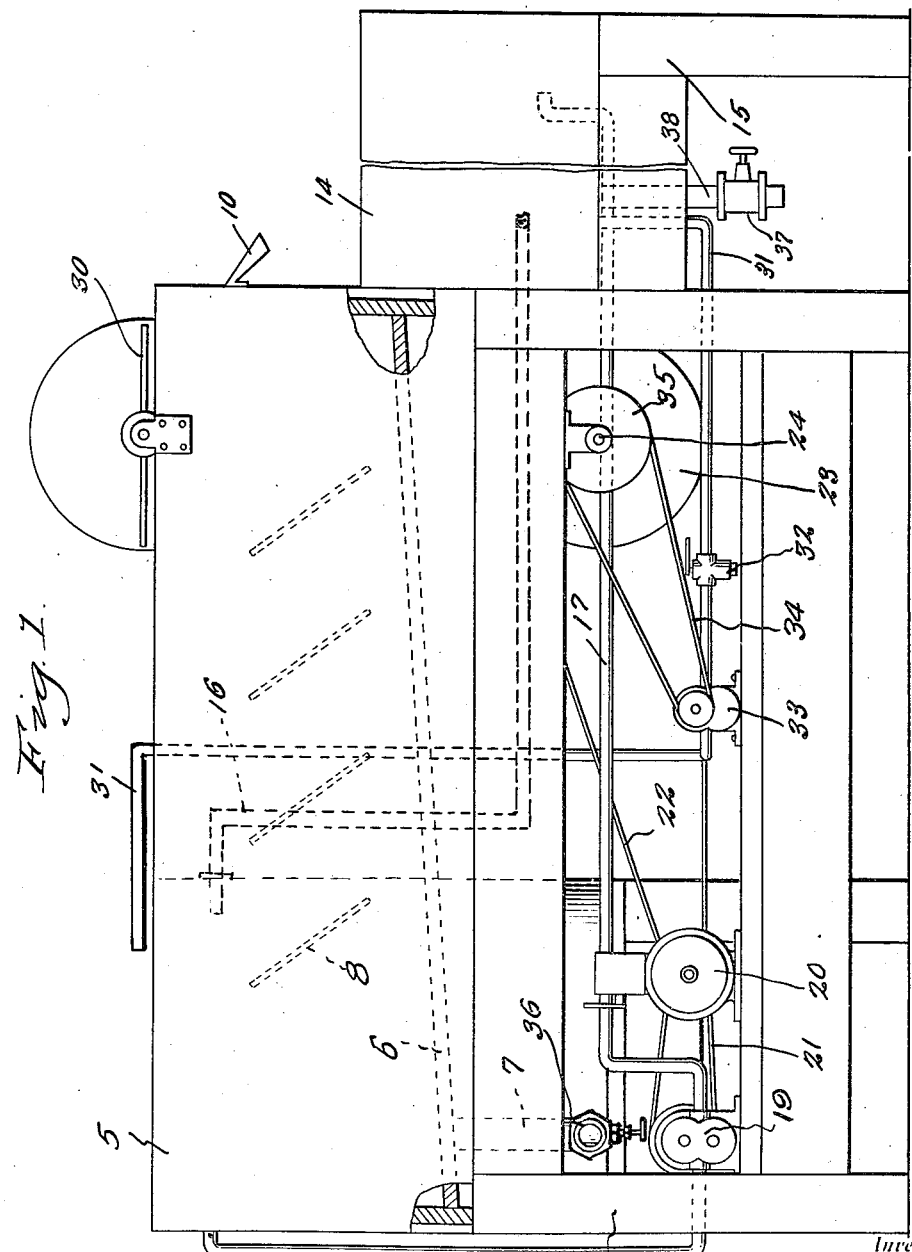
Inventor
Christy B. Nelson
By Clarence A. O'Brien
and Harvey B. Jackson, Attorneys

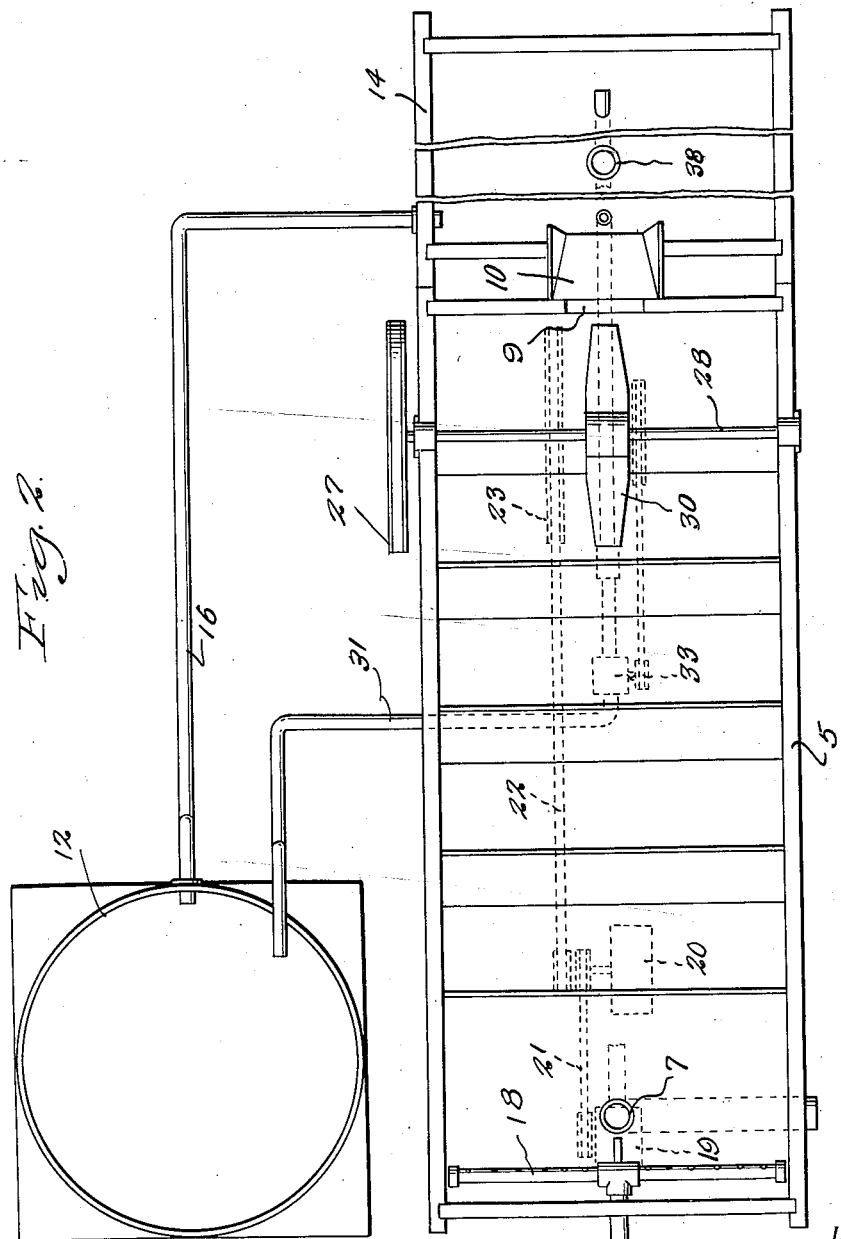

Aug. 10, 1943.　　　C. B. NELSON　　　2,326,485
SEA FOOD WASHING MACHINE
Filed April 14, 1942　　　3 Sheets-Sheet 3
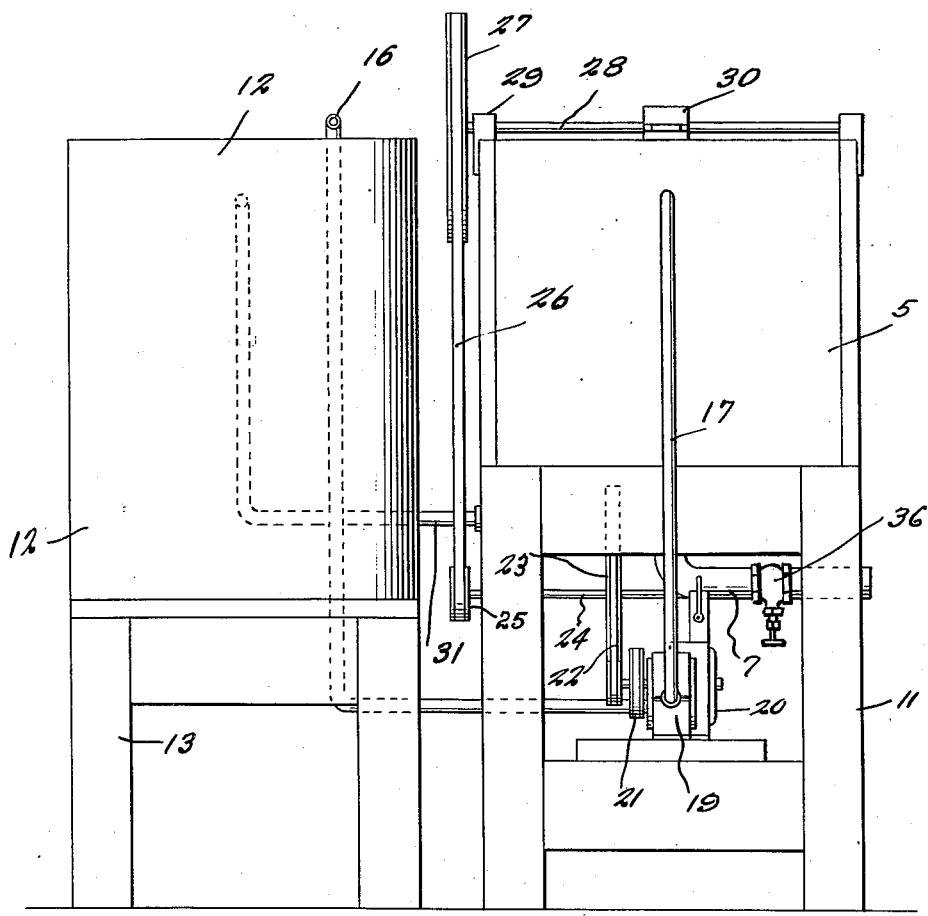
Inventor
Christy B. Nelson
By Clarence A. O'Brien
and Harvey B. Jackson, Attorneys Patented Aug. 10, 1943

2,326,485

UNITED STATES PATENT OFFICE 2,326,485

SEA FOOD WASHING MACHINE

Christy B. Nelson, Tokeland, Wash.

Application April 14, 1942, Serial No. 438,939

1 Claim. (Cl. 146—200)

The present invention relates to new and useful improvements in machines for washing fresh crabmeat and other sea food products to prepare the same for packing, processing, canning and shipping, and the invention has for its primary object to provide a tank adapted to receive the sea food, together with salt water for washing the food and providing means for moving the sea food over a series of baffles to separate particles of shells and other foreign substances therefrom and for removing the cleaned food from the tank over a discharge chute into a collection receptacle.

A further object of the invention is to provide a re-circulation system for the salt water employed in cleaning the food.

A still further object is to provide an apparatus of this character of simple and practical construction, which is efficient and reliable in performance, relatively inexpensive to manufacture and maintain in operation, and otherwise well-adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a side elevational view.

Figure 2 is a top plan view, and

Figure 3 is an end elevational view.

Referring now to the drawings in detail, wherein for the purpose of illustration I have disclosed a preferred embodiment of the invention, the numeral 5 designates a tank of substantially rectangular shape open at its top and having an inclined bottom 6 provided with a drain pipe 7 adjacent its lower end.

Positioned in the tank and extending transversely thereof are a plurality of baffles 8, the baffles being inclined from a vertical plane toward the deeper end of the tank and with the lower edges of the baffles spaced above the bottom of the tank and with the upper edges of the baffles disposed below the top of the tank, as shown to advantage in Figure 1 of the drawings.

The deeper end of the tank constitutes the intake end into which crabmeat to be cleaned is deposited and in the opposite end of the tank at its upper edge is provided a notch 9 communicating with a chute 10 secured to the outside of the tank.

The tank is suitably supported on a frame or platform 11 and a salt water supply tank 12 is supported on a frame or platform 13 adjacent one side of the tank 5.

An overflow receptacle 14 is supported on a frame 15 at the discharge end of the tank 5 immediately beneath the chute 10, and an overflow pipe 16 extends from the tank 12 adjacent its upper portion to the receptacle 14.

A pipe 17 has one end projecting upwardly to the receptacle 14 and extends under the tank 5 and upwardly at the intake end thereof and into the end wall of the tank 5 for connection with a transversely extending spray pipe 18.

A pump 19 is interposed in the pipe 17, which is driven by an electric motor 20 mounted on the lower portion of the frame 11 by means of a belt drive 21.

A belt 22 is also driven from the pump 20 and extends over a pulley 23 secured on a shaft 24 journaled on the frame 11 transversely beneath the tank 5 adjacent its discharge end, the shaft 24 also having a pulley 25 secured thereto which drives a belt 26 leading to a pulley 27 secured on one end of a transversely extending shaft 28 journaled in bearings 29 on the upper edge of the tank 5. Secured to the shaft 28 is a paddle wheel 30 disposed immediately in advance of the notch 9 and arranged with its blades projecting into the water in the tank to move the crabmeat floating on the surface of the water through the notch 9 into the chute 10 for deposit into the receptacle 14.

A return pipe 31 extends from the bottom of the receptacle 14 to the tank 12, the pipe 31 having a valve 32 therein and interposed in the pipe between the valve and the tank 12 is a pump 33 driven by a belt 34 from a pulley 35 also secured to the shaft 24. The receptacle 14 is also provided with a drain pipe 38, both of the drain pipes 7 and 38 having valves 36 and 37, respectively, therein.

In the operation of the device, the crabmeat is deposited in the tank 5 and the tank is filled with water up to the level of the notch 9 and upon the operation of the motor 20 the water will be circulated continuously from the water discharged into the receptacle 14 from the tank 5 through the pipe 17 and back into the tank 5 by the spray pipe 18. The crabmeat will float on the surface of the water and the shells, grit and other heavy particles settle to the bottom of the tank, the paddle wheel 30 moving the crabmeat toward the discharge end of the tank and through the notch 9 into the chute 10 where the same is deposited in the receptacle 14.

Any excess water discharged into the receptacle 14 can be piped to the tank 12 through the pipe 31 by opening the valve 32 and any overflow in the tank 12 will be then returned to the receptacle 14 through the pipe 16.

It is believed the details of construction, operation and advantages of the device will be readily understood from the foregoing without further detailed explanation.

Having thus described the invention what I claim is:

A cleaning apparatus of the class described comprising a tank, baffles arranged in the tank, an overflow chute at one end of the tank, an open receptacle beneath said chute, a paddle wheel journaled at the upper edge of the tank adjacent the chute and projecting into the water in the tank for moving material floating on the surface of the water into the chute for deposit into the receptacle, a reservoir adjacent the tank, a pipe extending from the receptacle to the tank, a spray pipe in the tank connected to said pipe, a pump for returning water from the receptacle through said pipe into the tank, a pipe leading from the receptacle to the reservoir, an overflow pipe leading from the reservoir to the receptacle, a pump in said second-named pipe and a motor operatively connected with the paddle wheel and said pumps.

CHRISTY B. NELSON.